(12) United States Patent
Kögel et al.

(10) Patent No.: US 12,497,249 B2
(45) Date of Patent: Dec. 16, 2025

(54) GROUPING DEVICE

(71) Applicant: SOMIC VERPACKUNGSMASCHINEN GMBH & CO. KG, Amerang (DE)

(72) Inventors: Christoph Kögel, Prutting (DE); Tobias Trentini, Eggstätt (DE)

(73) Assignee: SOMIC VERPACKUNGSMASCHINEN GMBH & CO. KG, Amerang (DE)

( * ) Notice: Subject to any disclaimer, the term of this patent is extended or adjusted under 35 U.S.C. 154(b) by 70 days.

(21) Appl. No.: 18/652,144

(22) Filed: May 1, 2024

(65) Prior Publication Data
US 2024/0367918 A1  Nov. 7, 2024

(30) Foreign Application Priority Data
May 4, 2023 (EP) .................................... 23171552

(51) Int. Cl.
| | | |
|---|---|---|
| *B65G 47/26* | (2006.01) | |
| *B65G 43/08* | (2006.01) | |
| *B65G 47/04* | (2006.01) | |
| *B65G 54/02* | (2006.01) | |
| *H02K 41/03* | (2006.01) | |

(52) U.S. Cl.
CPC ........... *B65G 47/261* (2013.01); *B65G 43/08* (2013.01); *B65G 47/04* (2013.01); *B65G 54/02* (2013.01); *H02K 41/031* (2013.01)

(58) Field of Classification Search
CPC ...... B65G 54/02; B65G 47/261; B65G 43/08; B65G 47/04; H02K 41/031
USPC ................................................ 198/619, 805
See application file for complete search history.

(56) References Cited

U.S. PATENT DOCUMENTS

| | | | | |
|---|---|---|---|---|
| 9,202,719 | B2 * | 12/2015 | Lu ......................... | H02K 1/2795 |
| 11,766,699 | B1 * | 9/2023 | Narayanan ........... | B65G 1/0478 |
| | | | | 198/619 |
| 12,323,078 | B2 * | 6/2025 | Stockem ............... | H02P 25/064 |
| 2020/0030995 | A1 | 1/2020 | Lu et al. | |

(Continued)

FOREIGN PATENT DOCUMENTS

| | | |
|---|---|---|
| DE | 102014214697 A1 | 1/2016 |
| DE | 102015209613 A1 | 12/2016 |

(Continued)

OTHER PUBLICATIONS

European Application No. 23171552.5, "Extended European Search Report", Oct. 24, 2023, 8 pages.

*Primary Examiner* — James R Bidwell
(74) *Attorney, Agent, or Firm* — Kilpatrick Townsend & Stockton LLP

(57) ABSTRACT

The invention relates to a grouping device for grouping objects, comprising a magnetic levitation conveying device with a working surface, a plurality of movers and a control device for controlling the movement of the movers, at least one feeding device for feeding objects and loading at least one mover located in a loading position, and at least one transfer device which transfers the at least one object in an unloading area to a downstream further device. According to the invention, the grouping device comprises a plurality of feeding devices, and the movers are moved along crossing-free movement paths from the loading positions to the at least one unloading area.

18 Claims, 4 Drawing Sheets

(56) References Cited

U.S. PATENT DOCUMENTS

Figure 1:
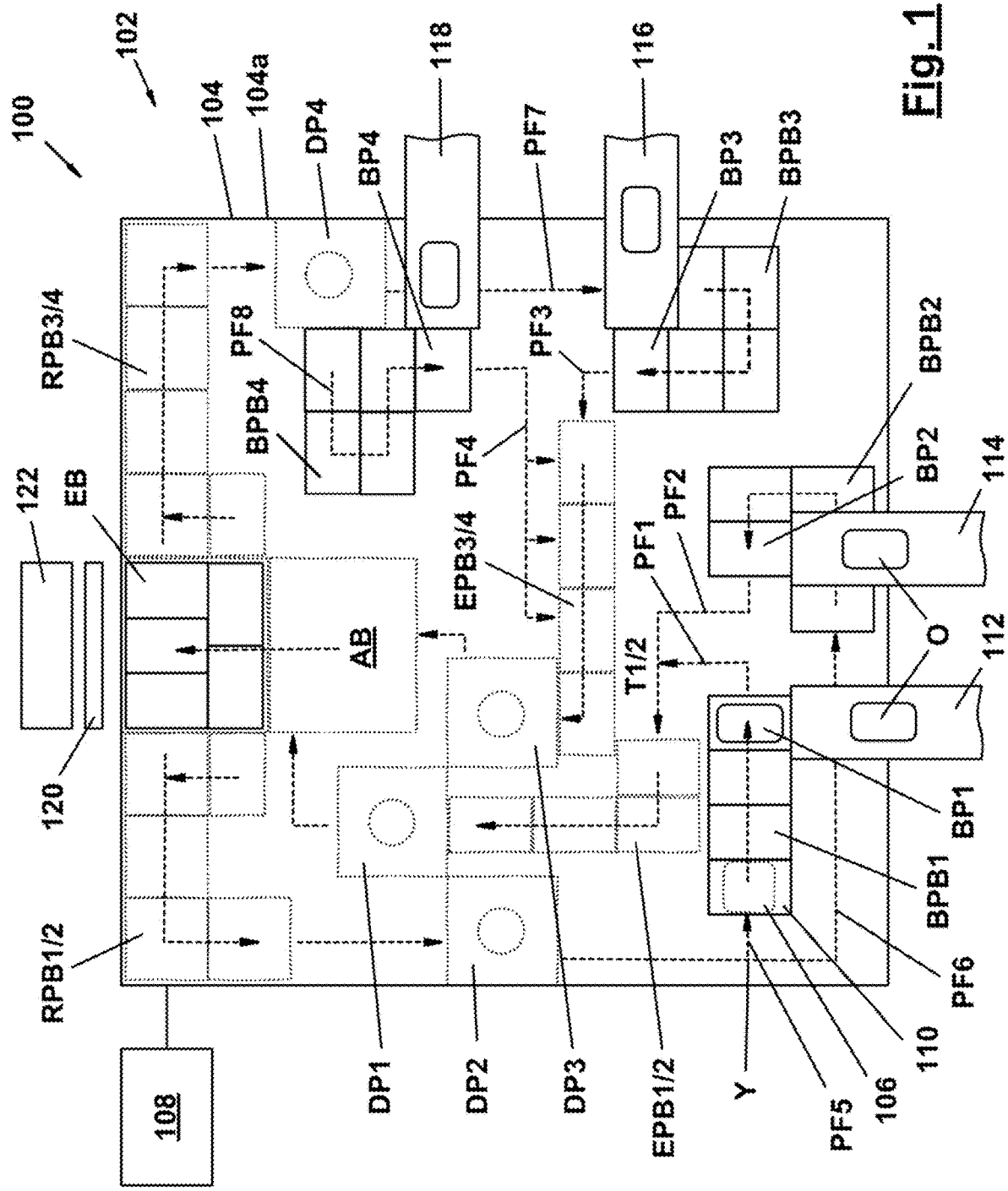

2023/0303341 A1* 9/2023 Ziegler ................ B65G 47/088
2023/0399180 A1* 12/2023 Diesner ................ B65G 47/261

FOREIGN PATENT DOCUMENTS

| DE | 102020120282 A1 | 2/2022 | |
| DE | 102020135153 A1 * | 6/2022 | ........... H02K 41/031 |
| DE | 102022105619 A1 * | 9/2023 | ........... H02K 41/031 |

* cited by examiner

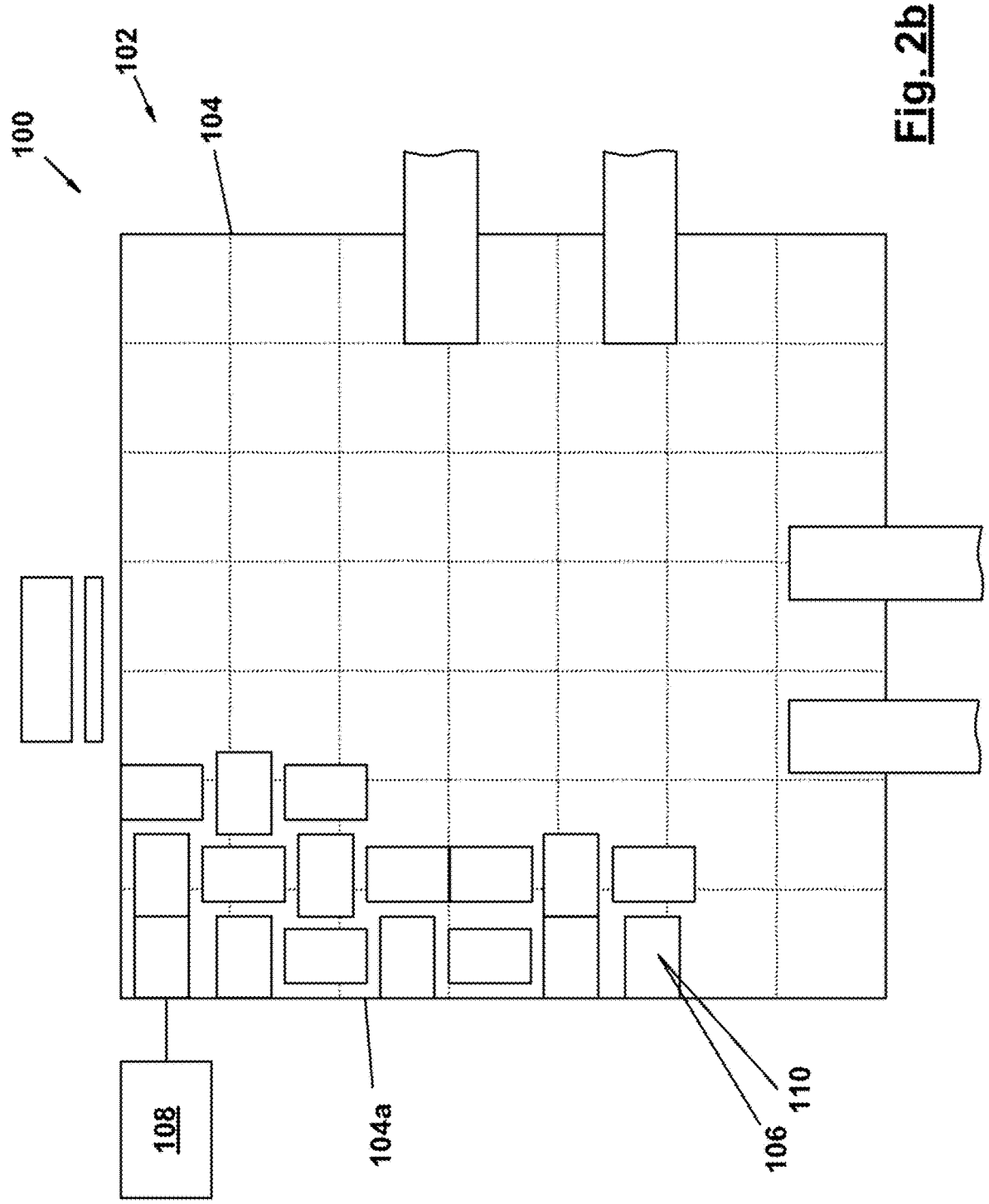

GROUPING DEVICE

CROSS REFERENCE TO RELATED APPLICATION

This application claims priority to European Patent Application No. 23171552.5, filed in Europe on May 4, 2023, the entire contents of which are hereby incorporated herein by this reference.

The invention relates to a grouping device for grouping objects, comprising a conveying device designed using magnetic levitation technology with a working surface formed by a plurality of stators, a plurality of movers movable on the working surface, and a control device for controlling the movement of the movers on the working surface, at least one feeding device for feeding the objects and loading at least one mover placed in a feeding device loading position with at least one of the objects, and at least one transfer device for unloading the at least one object from the at least one mover located in at least one unloading area of the grouping device and transferring the at least one unloaded object to a further device arranged downstream of the grouping device and not belonging to the grouping device, wherein the control device is designed and intended to move the at least one mover along a movement path from the loading position into the at least one unloading area.

Such a grouping device is known, for example, from US 2020/0 030 995 A1, which also generally describes the structure and function of a conveying device designed using magnetic levitation technology.

Based on this prior art, it is a task of the present invention to provide a grouping device usable in a variety of ways.

This task is solved according to the invention by a grouping device of the type mentioned above which comprises a plurality of feeding devices, each of which has a separate loading position, the control device being designed and intended to move the movers along crossing-free movement paths from the loading positions of the plurality of feeding devices to the at least one unloading area of the grouping device.

This makes it possible, for example, to feed the grouping device with a number of different types of objects corresponding to the number of feed devices, so that groups with mixed patterns of objects can also be assembled. Moreover, the crossing-freedom of the movement paths (hereinafter also referred to as "grouping movement paths") ensures that, even if problems occur along one of the movement paths, the unaffected movement paths can still be used to keep the grouping device in-albeit restricted-operation.

It should be noted that the concept of crossing-freedom in the context of the present invention is interpreted according to a narrow understanding. In particular, T-shaped or Y-shaped branches (one movement path running in, two movement paths running out) or confluences (two movement paths running in, one movement path running out) are not regarded as "crossings".

According to the invention, it is also advantageous if not only the grouping movement paths are designed to be crossing-free, but rather the control device is also designed and intended to move the movers along crossing-free movement paths from the at least one unloading area of the grouping device to the loading positions of the plurality of feeding devices. In the context of the present invention, the latter movement paths are also referred to hereinafter as "return movement paths".

To achieve crossing-freedom, it is advantageous if the grouping movement paths run entirely within the return movement paths. In this way, the grouping movement paths and return movement paths can be completely unraveled from one another in a simple manner, so that only within the respective group of movement paths is it necessary to ensure crossing-freedom according to the invention.

To make it easier to unravel the grouping movement paths and return movement paths, it is proposed that the loading position of at least one feeding device, preferably the loading positions of a plurality of feeding devices, even more preferably the loading positions of all feeding devices, is/are at a distance from the edge of the working surface of the conveying device designed using magnetic levitation technology that is greater than the dimensions of a mover. In this way, the movers can bypass the loading positions by moving under the ends of the feeding devices. However, the latter is also advantageous irrespective of the unraveling of the movement paths.

In order to transport the objects safely by means of the movers, it is proposed that a receptacle to receive the at least one object be fitted to at least one mover, preferably to a plurality of movers, even more preferably to all movers. The receptacle may, for example, be a receptacle as disclosed in the applicant's parallel pending EP No. 23 153 080.9, not yet published at the time of filing the present application.

In the event that the receptacles have less than four-fold rotational symmetry, for example only two-fold rotational symmetry, for example they do not have a square layout but a rectangular layout like the receptacle disclosed in EP No. 23 153 080.9, it is proposed in a further development of the invention that each grouping movement path and/or each return movement path has at least one rotation position to enable any arrangement of the grouped objects and/or to adapt to different feed directions of the feeding devices. To increase the throughput rate, i.e. the number of movers that can be moved along the respective movement path per unit of time, at least one of the movement paths can have a plurality of rotation positions. Advantageously, the movers can be rotated at the rotation positions at least by integer multiples of 90°, preferably in both directions of rotation.

To enable rapid mover changes at the loading positions, i.e. so that an unloaded mover can be moved as quickly as possible into the loading position after a loaded mover has left the respective loading position, it is proposed that the control device is designed and intended to move a mover loaded at a loading position, and thus to be moved away from the loading position, and an unloaded mover to be moved up to the loading position in the same direction at least over a distance which is equal to the length of the movers or the receptacle. This measure allows both movers to be moved synchronously. As a result, the next mover is already fully in the loading position by the time the departing, loaded mover has fully left the loading position. In other words, the next mover does not have to wait until the departing mover has fully left the loading position before it can start moving into the loading position.

If the receptacle is configured not only for one-dimensional loading of the receptacle with objects, i.e. not only for stacking objects on top of one another, but also for two-dimensional loading (arrangement of objects on top of and next to one another) and/or three-dimensional loading (arrangement of objects on top of, next to and behind one another), it may be advantageous for the control device to be designed and intended to move the next mover along with the mover currently being loaded, preferably in synchronization with the latter, even as it is being loaded. This ensures that no time is lost moving the next mover into the loading position after the loaded mover has been fully loaded.

Depending on the shape of the objects, it may be advantageous for the control device to be designed and intended to rotate the mover currently being loaded in the loading position by an integer multiple of 90°, for example 180°. This can, for example, enable space-saving stacking of wedge-shaped objects, such as wedge-shaped blocks of cheese.

In order to be able to mix objects of different types in the receptacle when loading the receptacles, it is proposed that the control device be designed and intended to move a mover to be loaded from the loading position assigned to a first feeding device to a loading position assigned to a second feeding device.

To also enable the fastest possible transfer of objects in the at least one unloading area to the further device, for example a packaging device, which is arranged downstream of the grouping device and does not belong to the grouping device, it can be provided that the control device is designed and intended to move the at least one mover to be unloaded in the orientation required for unloading into a set-up area arranged upstream of the respective unloading area. As soon as the previous mover has been unloaded by the transfer device and has left the at least one unloading area, the next mover to be unloaded, which is already waiting in the set-up area assigned to the at least one unloading area, can thus be moved from this set-up area into the unloading area during the time it takes to transfer the at least one object to the further device.

To enable the loading and unloading of the movers to dovetail smoothly and without delays, it is proposed in a further development of the invention that a buffer area for the temporary storage of at least two movers is arranged upstream of at least one feeding device and/or at least one unloading area. Advantageously, a rotation position can be assigned to the or each buffer area.

In a further development of the invention, the control device can have an operation preparation mode in addition to the operating mode explained above. In particular, the control device can be designed and intended to move all movers to predefined starting positions. In these starting positions, the control device can then assign the individual movers an identification that is valid at least for the next operating mode. Proceeding from the starting positions, the movers can then be rotated if necessary and moved specifically to operating start positions from which the operating mode can then be started.

The starting positions can preferably be selected such that the movers are at a distance from one another that allows each of the movers, possibly including the receptacle, to be rotated.

To be able to rectify faults which may be caused, for example, by the malfunctioning of sensors and/or the snagging of at least one object in one of the receptacles, in a further development of the invention the control device can also have a fault clearance mode in addition to the operating mode and, if applicable, the operation preparation mode. In particular, the control device can be designed and intended to move at least the loaded movers to predefined fault clearance positions. Advantageously, the fault clearance positions are chosen such that the objects placed in the receptacles of the loaded movers can be easily removed by an operator. In this context, the control device can determine whether or not a mover is loaded, for example, on the basis of the electrical current needed to keep the mover in a predefined floating state above the working surface of the conveying device designed using magnetic levitation technology.

The control device can then use the operation preparation mode to prepare for further operation of the grouping device in operating mode.

The invention will be explained in more detail below on the basis of an exemplary embodiment with reference to the attached drawings. These show the following:

FIG. 1 A schematic plan view of a grouping device according to the invention to illustrate the operating mode.

Figure 2A:
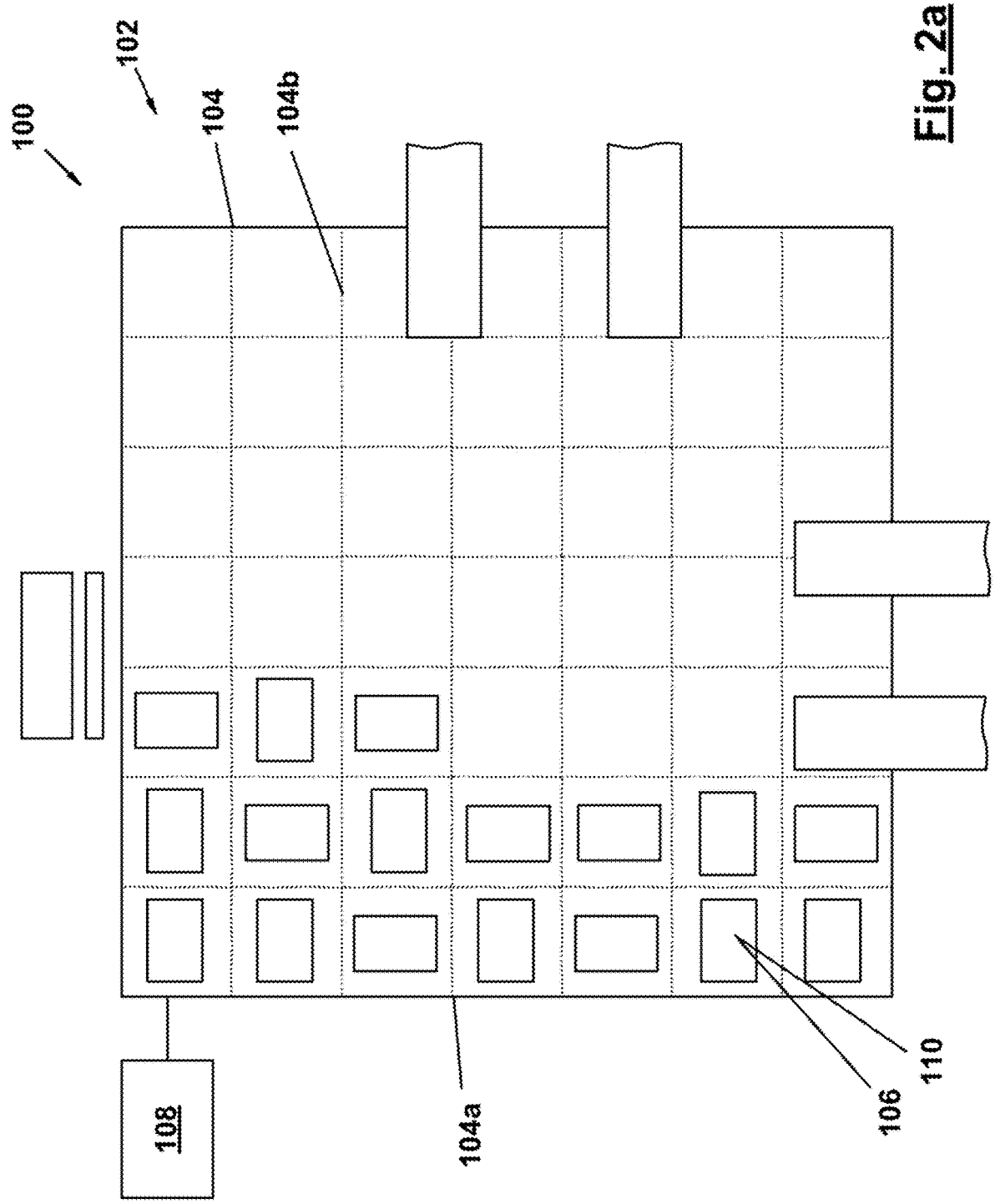

FIGS. 2a and 2b Two views similar to FIG. 1 to illustrate the operation preparation mode.

Figure 3:
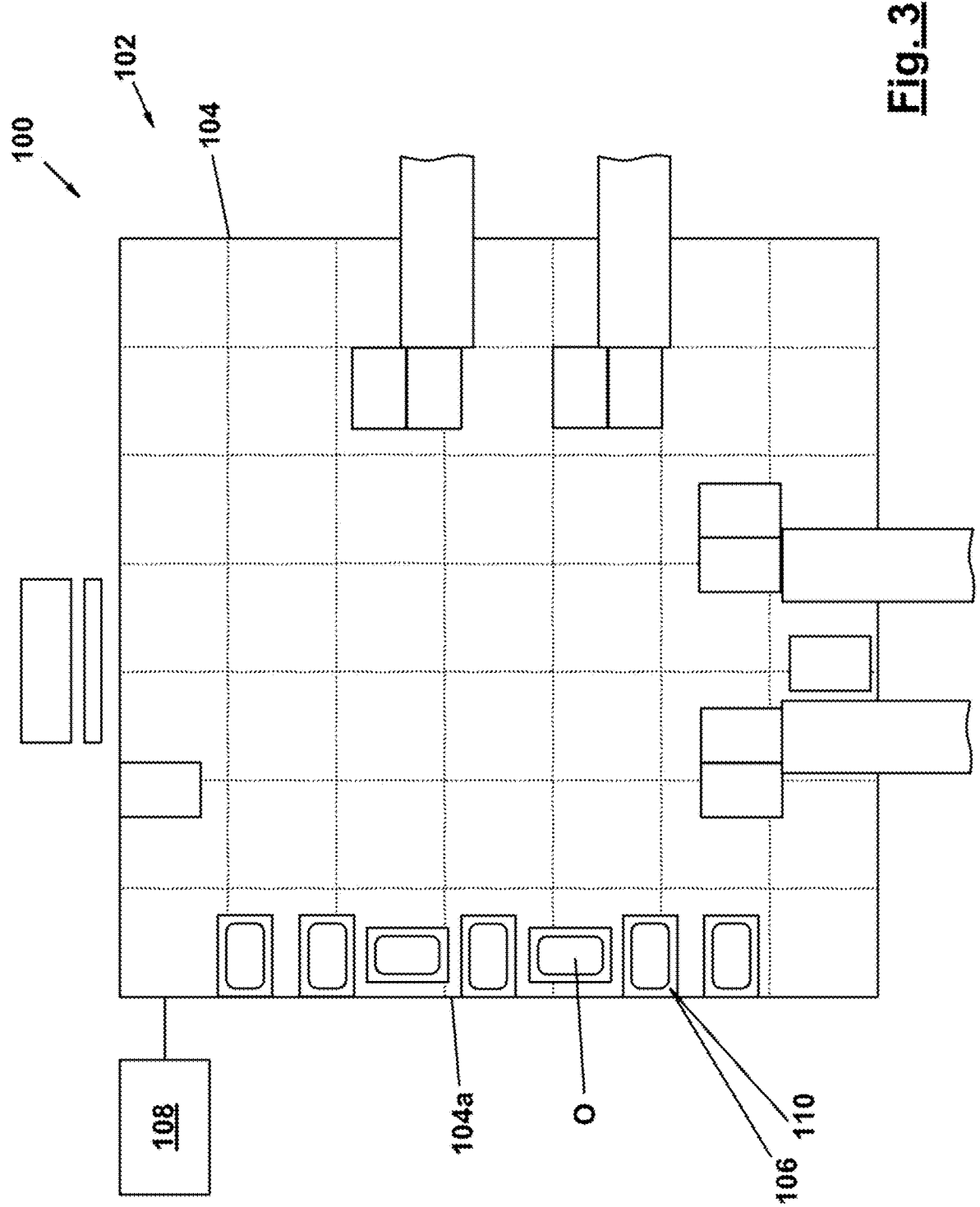

FIG. 3 A view similar to FIG. 1 to illustrate the fault clearance mode.

In FIG. 1, a grouping device according to the invention is generally designated with the reference number 100.

The grouping device 100 comprises a conveying device 102 designed using magnetic levitation technology with a working surface 104, a plurality of movers 106 movable on the working surface 104 and a control device 108 to control the movement of the movers 106 on the working surface 104. The working surface 104 can, for example, be composed of a plurality of stators 104b (see FIG. 2a) not shown in FIG. 1 for the sake of clarity. Each of these stators may include a plurality of electromagnetic coils that can be controlled by the control device 108 to move the movers 106 equipped with permanent magnets along the working surface 104.

For the sake of clarity, only one of the movers is shown in FIG. 1 by a dotted line and indicated by the reference number 106. Otherwise, FIG. 1 shows only the receptacles 110, which are attached to and project above the movers 106 and which serve to receive the objects O fed into them via the feeding devices 112, 114, 116, 118.

The objects O are transferred at loading positions BP1, BP2, BP3, BP4 from the feeding devices 112, 114, 116, 118 to the movers 106 or to the receptacles 110 mounted upon them. From the loading positions BP1, BP2, BP3, BP4, the movers 106 move along movement paths PF1, PF2, PF3, PF4 (to be explained in more detail below) to an unloading area EB, in which they are arranged according to a predefined grouping pattern of the objects O. In the illustrated exemplary embodiment, this is a 3+2 pattern with three movers 106 arranged next to one another, oriented in the up-down direction in FIG. 1, and two movers 106 oriented transversely below, i.e. in the right-left direction. In the unloading area EB, the objects O are unloaded from the movers 106 or from their receptacles 110 by means of a transfer device 120 and transferred in the grouping pattern to a further device 122, for example a packaging device.

From the unloading area EB, the movers 106 are then moved back along movement paths PF5, PF6, PF7, PF8 to the feeding devices 112, 114, 116, 118.

In the context of the present invention, the movement paths PF1, PF2, PF3, PF4 are referred to as grouping movement paths, while the movement paths PF5, PF6, PF7, PF8 are collectively referred to as return movement paths.

The path of a mover 106 from the loading position, for example the loading position BP1 assigned to the feeding device 112, to the unloading area EB and from there back to the feeding device 112 is explained in more detail below. However, this explanation can also be applied in an analogous manner to the movers 106 proceeding from the other feed devices 114, 116, 118.

As shown in FIG. 1, a buffer area BPB1 is located in front of the loading position BP1, in which three movers 106 are waiting to be loaded by the feeding device 112 in the snapshot situation of FIG. 1. The rightmost of these movers 106 in FIG. 1 is located in the immediate vicinity of the mover 106 that is currently being loaded by the feeding device 112. As soon as this mover is loaded, it is moved to the right under the control of the control device 108 in FIG. 1, so that the mover 106 just mentioned, which is waiting to be loaded, can move up without delay.

As soon as the loaded mover 106 has left the loading position BP1, it turns upwards following the grouping movement path PF1 in FIG. 1. The grouping movement paths PF1 and PF2 are merged at a T-junction T1/2. Since the control device 108 knows the respective momentary positions of all movers 106, it can easily prevent movers 106 from colliding at the junction T1/2. In addition, loading the movers 106 with a number of objects O takes a certain amount of time, so that movers 106 do not often arrive at the junction T1/2 simultaneously in any case.

The mover 106 is then moved to an unloading buffer area EPB1/2, where it waits to be unloaded in the unloading area EB. Since the movers 106 coming from the feeding devices 112 and 114 all have the same orientation, each waiting position of the unloading buffer area EPB1/2 has a size and orientation corresponding to this orientation, so that exactly one mover 106 with receptacle 110 attached can be arranged in each waiting position.

To be able to rotate the mover 106 and thus its receptacle 110, so that the movers 106 coming from the feeding devices 112 and 114 can also assume one of the two transverse positions of the 3+2 pattern if necessary, a rotation position DP1 is provided at the end of the unloading buffer area EPB1/2, in which the movers 106 can be rotated by at least integer multiples of 90°.

With regard to the rotation position DP1, it should also be noted that the part of the working surface 104 reserved for it is sufficiently large to ensure that a mover 106 with its receptacle 110 rotated at the rotation position cannot collide with any other mover 106 or its receptacle 110 on being rotated.

It should further be noted that the part of the working surface 104 reserved for the rotation position DP1 is exactly the same size as a stator 104*b* of the working surface 104. Based on the rotation positions DP1, DP2, DP3, DP4, it is therefore possible to estimate where the stators 104*b* are arranged in FIG. 1. However, if the diagonal of the receptacle is greater than the length of a stator, a larger area must be reserved.

From the rotation position DP1, the mover 106 is further moved into a set-up area AB, namely to a position of the 3+2 pattern predefined for it by the control device 108. The same also applies to the movers 106 coming from the feeding devices 116, 118 after passing through the rotation position DP3. In this way, in the set-up area AB, a complete 3+2 pattern of movers 106 is prepared for unloading in the unloading area EB.

As soon as the transfer device 120 has unloaded the previous 3+2 pattern and transferred it to the further device 122, and the unloading area EB is empty again, the movers 106 waiting in the set-up area AB are moved together, i.e. synchronously, into the unloading area EB. If the set-up area AB is not yet completely filled, the movers 106 present in it are nevertheless already transferred to the unloading area EB.

After unloading, the movers 106 with their now once again empty receptacles 110 in FIG. 1 are moved left and right into return buffer areas RPB1/2, RPB3/4. Since it is not clear from which position of the 3+2 pattern a respective mover 106 will reach the return buffer areas RPB1/2, RPB3/4, the individual waiting positions of the return buffer areas RPB1/2, RPB3/4 are sufficiently large to ensure that the movers 106 can be fully accommodated therein regardless of their respective orientation. The waiting positions of the return buffer areas RPB1/2, RPB3/4 are therefore larger than those of the unloading buffer areas EPB1/2, EPB3/4.

In order to nevertheless ensure that the movers 106 can be fed to the respective feeding device 112, 114, 116, 118 in the orientation required for this purpose, further rotation positions DP2, DP4 are provided after the return buffer areas RPB1/2, RPB3/4.

With regard to the arrangement and size of the rotation positions DP2, DP4, the same applies to the rotation positions DP1, DP3.

At a branching point Y, the movers 106 are divided into a return movement path PF5 leading to the feeding device 112 and a return movement path PF6 leading to the feeding device 114. In the case of the feeding devices 116, 118, the rotation position DP4 performs this function for the return movement paths PF7, PF8.

At this point, it is again expressly pointed out that the movement path pairs PF1/PF2, PF3/PF4, PF5/PF6, PF7/PF8 each run together along at least part of their length.

As can be seen in FIG. 1, the return movement paths PF6, PF7 pass under the feeding devices 112, 118. To achieve this, the loading positions BP1, BP4 are at a distance from the edge 104*a* of the working surface 104 that enables a mover 106 to move past on the outermost movement path of the working surface 104 without collision. In addition, the feeding devices 112, 118 must be arranged at least high enough to allow a floating mover 106 with receptacle 110 attached to pass underneath.

By arranging the return movement paths PF5, PF6, PF7, PF8 in the outer areas of the working surface 104 and the grouping movement paths PF1, PF2, PF3, PF4 in the inner areas of the working surface 104, and by leading the return movement paths PF6, PF7 under the feeding devices 112, 118, the movement paths can be made entirely crossing-free. Only T or Y junctions or branches are used to reduce the size of the required working area 104.

At this point it should be added that loading buffer areas BPB2, BPB3, BPB4 are also assigned to the feeding devices 114, 116, 118.

To make it easier to start up the grouping device 100, the control device 108 according to the invention can make use of an operation preparation mode, which will be explained below with reference to FIGS. 2*a* and 2*b*.

In the present case, it is assumed that the movers 106 are at their respective last positions after the end of the last operating cycle, for example on the evening of the previous day. Since these positions can vary from day to day, the aim of the operation preparation mode is to bring the movers 106 into predefined starting positions in order to facilitate the restart of the grouping device.

For this purpose the movers can be moved, depending on their respective current positions, to the edge 104*a* of the working surface 104 of the conveying device 102 and arranged there according to a predefined grid pattern, for example the grid pattern shown in FIG. 2*a*. In this arrangement, each mover 106 is arranged in an area whose size is equal to that of one of the stators 104*b* (indicated by dotted lines) of the working surface 104. This ensures that each of the movers 106 can be rotated to the orientation required by the control device 108 without colliding with other movers 106 or their receptacles 110.

Starting from these starting positions, the movers 106 can first be aligned in the required orientation and then brought to the intended operating start position, from which operating mode can then be started.

It should also be added that the movers can first be moved closer together, as shown in FIG. 2b, before they assume the predefined grid pattern.

A fault clearance mode of the control device 108 will now be explained with reference to FIG. 3. If, for any reason whatsoever, there is a malfunction in the operation mode sequence that results in operation being interrupted, the objects O must first be removed from the movers 106 loaded with objects O before operation can be resumed, for example by using the operation preparation mode. To make it easier for the responsible operator to unload the movers 106, the fault clearance mode provides for all loaded movers 106 to be moved to the edge 104a of the working surface 104, as this is the easiest place for the operator to access them. This arrangement of the movers 106 is shown in FIG. 3.

The invention claimed is:

1. A grouping device for grouping objects, comprising:
a conveying device configured for using magnetic levitation technology, the conveying device having i) a working surface comprising a plurality of stators, ii) a plurality of movers movable on the working surface, and iii) a control device configured to control movement of the movers on the working surface;
a plurality of feeding devices, wherein each feeding device (a) has a respective loading position that is separate from additional loading positions of each additional feeding device and (b) is configured for feeding one or more objects and loading at least one mover of the plurality of movers, wherein the at least one mover has a first location in a loading position of at least one feeding device of the plurality of feeding devices with at least one object of the one or more objects; and
at least one transfer device for unloading the at least one object from the at least one mover, wherein the at least one mover has a second location in at least one unloading area of the grouping device, wherein the at least one transfer device is configured for transferring the at least one unloaded object to a further device arranged downstream of the grouping device, wherein the further device is not part of the grouping device,
wherein the control device is configured for moving the at least one mover along at least one movement path from the loading position to the at least one unloading area,
wherein the control device is further configured for moving the movers along crossing-free movement paths from the respective loading positions of the plurality of feeding devices to the at least one unloading area of the grouping device, and
wherein the loading position of the at least one feeding device is at a distance from an edge of the working surface of the conveying device, the distance being greater than dimensions of the at least one mover.

2. The grouping device according to claim 1, wherein the control device is further configured for moving the movers along return crossing-free movement paths from the at least one unloading area of the grouping device to the respective loading positions of the plurality of feeding devices.

3. The grouping device according to claim 2, wherein the crossing-free movement paths run entirely within the return crossing-free movement paths.

4. The grouping device according to claim 2, wherein each of the return crossing-free movement paths has at least one rotation position.

5. The grouping device according to claim 1, wherein each of the crossing-free movement paths has at least one rotation position.

6. The grouping device according to claim 1, wherein each respective loading position of each of the plurality of feeding devices is at a respective distance from a respective edge of the working surface of the conveying device, each respective distance being greater than dimensions of the plurality of movers.

7. The grouping device according to claim 1, wherein a receptacle for receiving the at least one object is fitted to the least one mover.

8. The grouping device according to claim 7, wherein a respective receptacle for receiving the at least one object is fitted to each mover of the plurality of movers.

9. The grouping device according to claim 8, wherein the control device is further configured for:
moving a particular mover loaded at a particular loading position away from the particular loading position, and
moving a particular unloaded mover to the particular loading position,
wherein the control device is further configured for moving the particular mover and the particular unloaded mover in a same direction at least over an additional distance which is equal to i) a first length of the particular mover or the particular unloaded mover, or ii) a second length of a particular receptacle fitted to either the particular mover or the particular unloaded mover.

10. The grouping device according to claim 9, wherein the control device is further configured for:
during a loading of the particular mover at the particular loading position, moving the particular unloaded mover to the particular loading position.

11. The grouping device according to claim 10, wherein:
during the loading of the particular mover at the particular loading position, the moving the particular mover loaded away from the particular loading position and the moving the particular unloaded mover to the particular loading position are synchronized.

12. The grouping device according to claim 1, wherein the control device is further configured for rotating the at least one mover in the loading position by an integer multiple of 90°.

13. The grouping device according to claim 1, wherein the control device is further configured for moving the at least one mover from the first location in the loading position of the at least one feeding device to an additional location in an additional loading position assigned to an additional feeding device of the plurality of feeding devices.

14. The grouping device according to claim 1, wherein the control device is further configured for, in a set-up area arranged upstream of the at least one unloading area, moving the at least one mover in an orientation for unloading.

15. The grouping device according to claim 1, wherein a buffer area for temporary storage of at least two movers of the plurality of movers is arranged upstream of i) the at least one feeding device or ii) the at least one unloading area.

16. The grouping device according to claim 1, wherein the control device is further configured for moving the plurality of movers to respective predefined starting positions.

17. The grouping device according to claim 16, wherein the respective predefined starting positions are positioned such that each mover of the plurality of movers is at an additional distance from additional movers of the plurality of movers, the additional distance allowing each mover to be rotated.

18. The grouping device according to claim 1, wherein the control device is further configured for moving each loaded mover of the plurality of movers to respective predefined fault clearance positions.

\* \* \* \* \*